US005934431A

United States Patent [19]

Bladow

[11] Patent Number: 5,934,431

[45] Date of Patent: Aug. 10, 1999

[54] PLATEAU CONTROL ALGORITHM FOR AN ELECTRO-HYDRAULIC ACTUATOR

[75] Inventor: Craig W. Bladow, Perrysburg, Ohio

[73] Assignee: Dana Corporation, Toledo, Ohio

[21] Appl. No.: 08/777,502

[22] Filed: Dec. 30, 1996

[51] Int. Cl.[6] .............................. F15B 21/08; F16D 48/06

[52] U.S. Cl. .......................... 192/85 R; 91/35; 192/109 F

[58] Field of Search .............................. 192/85 R, 109 F; 91/35, 471, 393, 392; 137/1; 251/129.01; 60/469

[56] References Cited

U.S. PATENT DOCUMENTS

| | | | |
|---|---|---|---|
| 4,411,345 | 10/1983 | Haight et al. | 192/109 F X |
| 4,674,613 | 6/1987 | Sikorski | 192/85 R X |
| 4,930,080 | 5/1990 | Suzuki | 192/109 F X |
| 5,117,953 | 6/1992 | Machida et al. | 192/109 F X |
| 5,168,973 | 12/1992 | Asayama et al. | 192/85 R |
| 5,240,096 | 8/1993 | Ueki | 192/109 F X |
| 5,343,994 | 9/1994 | Kyrtsos | 192/85 R |
| 5,366,420 | 11/1994 | Kuriyama et al. | 192/85 R X |
| 5,667,052 | 9/1997 | Richardson | 192/85 R |

*Primary Examiner*—Rodney H. Bonck
*Attorney, Agent, or Firm*—MacMillan, Sobanski & Todd, LLC

[57] ABSTRACT

A control system and method for operating the solenoid valves for controlling the supply of hydraulic fluid to a hydraulic actuator is described. The system and the method involves initially applying a first, increasing linear pressure up to a predetermined magnitude and then holding the pressure at that level for a period of time. This predetermined magnitude is equal to the amount of pressure required to cause initial movement of the piston. By holding the pressure level at a plateau for a period of time, the initial movement of the piston is accomplished in a smooth manner. This period of time is relatively short, typically less than one second. Thereafter, the system and the method involve operating the solenoid valves so as to apply a second, increasing linear pressure up to a predetermined final magnitude.

19 Claims, 2 Drawing Sheets

PLATEAU CONTROL ALGORITHM FOR AN ELECTRO-HYDRAULIC ACTUATOR

BACKGROUND OF THE INVENTION

This invention relates in general to systems and methods for controlling the operation of an electro-hydraulic actuator. In particular, this invention relates to a system and method in which an increasing, linear commanded valve position signal is held constant for a short period of time when the signal reaches a valve position corresponding to a threshold hydraulic fluid pressure at which the hydraulic actuator begins to move.

In general, an electro-hydraulic actuator includes a cylinder having a piston disposed therein which is connected for movement with a mechanical device. The piston and the controlled device are moved under the influence of pressurized hydraulic fluid supplied to the interior of the hydraulic cylinder in response to the opening and closing of solenoid valves. The electronic controller controls the operation of the valves so as to cause the movement of the controlled device from an existing position to a desired position.

In the past, the electronic controller operated the solenoid valves to apply an increasing linear pressure against the piston to cause movement of the controlled mechanical device. In actual practice, however, it has been found that the piston does not initially move until a predetermined amount of pressure is applied thereto. As a result, the piston has been found to initially remain stationary, then subsequently jerk into initial movement which continues until the desired position is reached. Thus, it would be desirable to provide a control system and method for an electro-hydraulic actuator which eliminates this undesirable initial jerking movement.

SUMMARY OF THE INVENTION

This invention is directed to a control system and method for operating the solenoid valves for controlling the supply of hydraulic fluid to a hydraulic actuator. The system and the method involves initially applying an increasing linear pressure up to a predetermined magnitude and then holding the pressure at that level for a period of time. This predetermined magnitude is equal to the amount of pressure required to cause initial movement of the piston. By holding the pressure level at a plateau for a period of time, the initial movement of the piston is accomplished in a smooth manner. This period of time is relatively short, typically less than one second. Thereafter, the system and the method involve operating the solenoid valves so as to apply a further increasing linear pressure up to a predetermined final magnitude.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
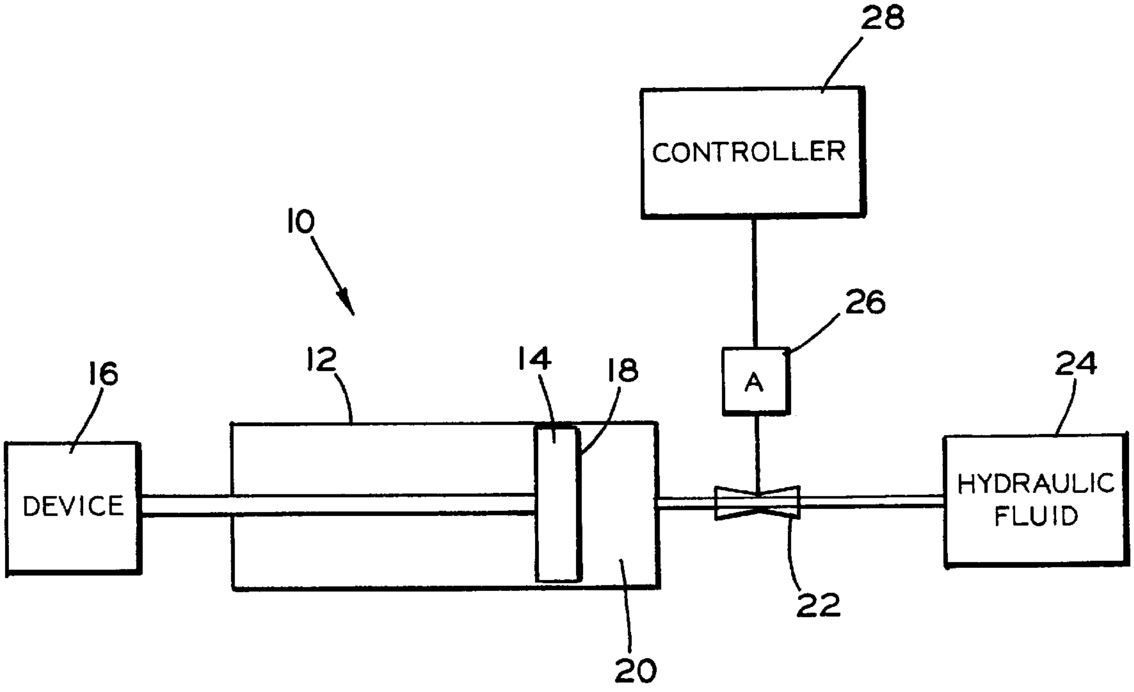
FIG. 1 is a simplified schematic of a basic electro-hydraulic actuator.

Referring now to the drawings, there is illustrated in FIG. 1 an electro-hydraulic actuator, indicated generally at 10. The electro-hydraulic actuator 10 includes a cylinder 12 having a piston 14 disposed therein. The piston 14 is connected for movement with a device 16. The opposite end of the piston 14 has a surface 18 which forms a chamber 20 with a portion of the cylinder 12. One or more valves 22 control the supply of hydraulic fluid 24 to the chamber 20 of the cylinder 12. When hydraulic fluid 24 is supplied to the chamber 20, the pressure of the hydraulic fluid 24 against the surface 18 moves the piston 14 (to the left when viewing FIG. 1.) The valve 22 may be operated using an electrical actuator 26, such as a solenoid. In turn, the solenoid 26 may be operated by an electronic controller 28.

Figure 2:
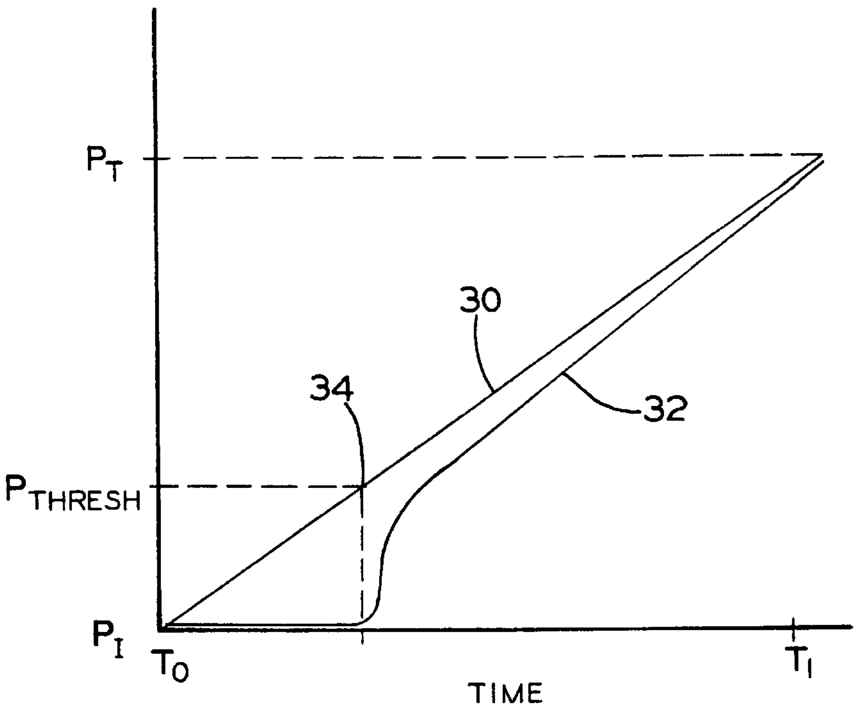
FIG. 2 (PRIOR ART)
FIG. 2 is a graphical representation of valve position versus time for both a commanded position and an actual position in accordance with the prior art.

The pressure of the hydraulic fluid 24 within the chamber 20 may be controlled by selectively energizing and/or de-energizing the solenoid 26. Typically, the controller 28 provides a commanded valve position signal to the solenoid 26 so as to open the valve 22 from an initial position to a target position. A graphical representation of a commanded valve position signal 30 versus time, in accordance with the prior art, is provided in FIG. 2. In the illustrated example, the commanded valve position 30 is an increasing linear signal which starts from an initial position at time zero and continues to a target position at time $T_i$. (The initial valve position may or may not be fully closed or zero.) Also shown in FIG. 2 is the actual position 32 of the valve which results when the commanded valve position signal 30 is used to control the solenoid 26 and the valve 22. When the valve 22 begins to open, hydraulic fluid 24 is admitted into the chamber 20. However, the initial pressure of the hydraulic fluid 24 against the surface 18 of the piston 14 may not be sufficient to overcome the forces which hold the piston 14 in its initial position. Therefore, until the pressure of the hydraulic fluid 24 reaches a minimum threshold limit (which is a function of each piston/cylinder arrangement) the piston 14 remains stationary.

Under these conditions, when the pressure of the hydraulic fluid 24 contained within the chamber 20 exceeds the minimum threshold limit, the piston 14 may initially jerk into motion. This result is shown graphically in FIG. 2 where it can be seen that the actual valve position 32 remains at the initial position until the commanded valve position signal 30 exceeds the minimum threshold limit 34. After the piston 14 exhibits this rapid initial movement, the actual valve position 32 more gradually approaches the commanded valve position signal 30 as shown in FIG. 2.

Figure 3:
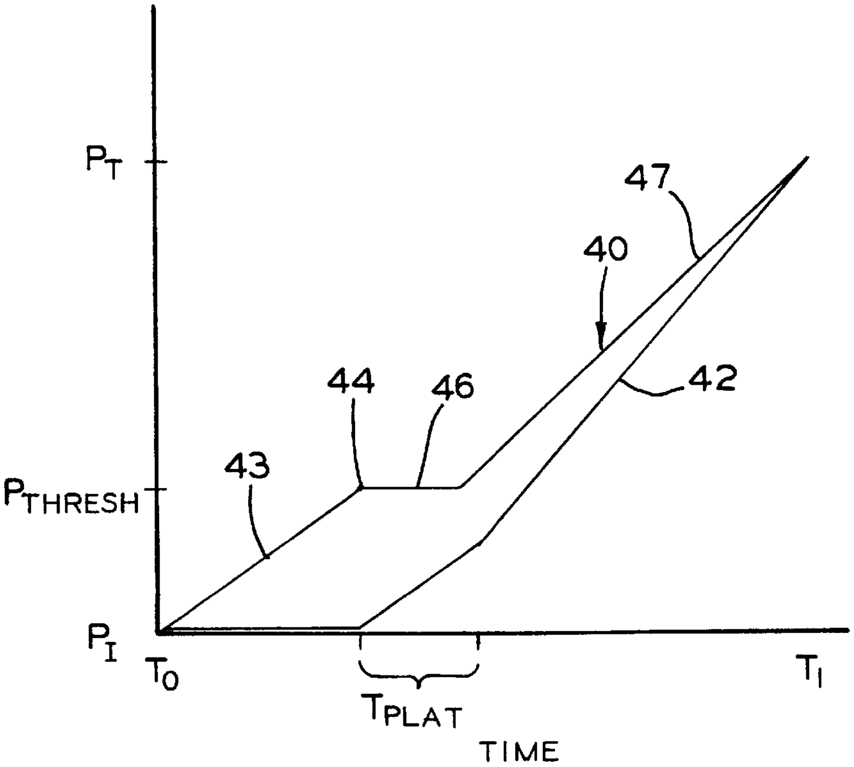
FIG. 3 is a graphical representation of valve position versus time for both a commanded position and an actual position in accordance with this invention.

In order to eliminate the undesirable initial rapid motion of the piston 14, this invention is directed to providing a commanded valve position signal 40 as shown in FIG. 3. Similarly to FIG. 2, the actual valve position 42 which results when the commanded valve position signal 40 is used to control the solenoid 26 and the valve 22 is also shown in FIG. 3. As shown therein, the commanded valve position 40 includes a first increasing linear portion 43 which is ramped up from an initial position $P_I$ to the piston movement threshold minimum limit $P_{THRESH}$ 44. At this point, the commanded valve signal 40 is held constant at a plateau 46 for a predetermined time period. The period of time during which the commanded valve position signal 40 is maintained at the plateau 46, hereinafter referred to as $T_{PLAT}$, may be varied. Typically, the time period $T_{PLAT}$ is very short. In a preferred embodiment, $T_{PLAT}$ is less than one second. After the plateau 46, the commanded valve position signal 40 includes a second, increasing linear portion 47 which is continued until the target position $P_T$ is reached.

As further shown in FIG. 3, the actual valve position 42 which results when using the commanded valve position signal 40 does not include the initial upward spiked movement. Instead, the actual valve position 42 increases gradually during the plateau 46 portion of the commanded valve position signal 40 so as to produce a smoother start of the piston 14. Eventually, the actual valve position 42 closely approaches the commanded valve signal 40 until the target position $P_T$ is reached.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for controlling the operation of an electrically-operated valve adapted for supplying hydraulic fluid to a hydraulic actuator, said method comprising:

providing a first gradually increasing valve position signal from an initial valve position up to a threshold valve position, said threshold valve position being representative of a hydraulic fluid pressure which is sufficient to cause said hydraulic actuator to begin to move, providing a constant valve position signal for a time period which starts when said threshold valve position is reached, and providing a second gradually increasing valve position signal after said time period expires, said second increasing valve position signal being provided from said threshold valve position up to a target valve position.

2. The method defined in claim 1 wherein said time period of said constant valve position signal is shorter than time periods of said first and second increasing valve position signals.

3. The method defined in claim 1 wherein said time period of said constant valve position signal is less than one second.

4. The method defined in claim 1 wherein said first and second increasing valve position signals are linear.

5. The method defined in claim 1 wherein said first and second increasing valve position signals and said constant valve position signal are adapted to cause said hydraulic actuator to move smoothly.

6. The method defined in claim 1 wherein said threshold valve position and said time period of said constant valve position signal are predetermined.

7. An electro-hydraulic actuator assembly comprising:

a hydraulic actuator adapted for movement to control an associated device, an electrically-operated valve adapted for supplying hydraulic fluid to said hydraulic actuator to cause said movement, and an electronic controller adapted for transmitting signals to control the operation of said valve, said electronic controller being programmed for:

providing a first gradually increasing valve position signal from an initial valve position up to a threshold valve position, said threshold valve position being representative of a hydraulic fluid pressure which is sufficient to cause said hydraulic actuator to begin to move, providing a constant valve position signal for a time period which starts when said threshold valve position is reached, and providing a second gradually increasing valve position signal after said time period expires, said second increasing valve position signal being provided from said threshold valve position up to a target valve position.

8. The actuator assembly defined in claim 7 wherein said time period of said constant valve position signal is shorter than time periods of said first and second increasing valve position signals.

9. The actuator assembly defined in claim 7 wherein said time period of said constant valve position signal is less than one second.

10. The actuator assembly defined in claim 7 wherein said first and second increasing valve position signals are linear.

11. The actuator assembly defined in claim 7 wherein said first and second increasing valve position signals and said constant valve position signal are adapted to cause said hydraulic actuator to move smoothly.

12. The actuator assembly defined in claim 7 wherein said threshold valve position and said time period of said constant valve position signal are predetermined.

13. The actuator assembly defined in claim 7 wherein said hydraulic actuator comprises a cylinder having a piston disposed therein which is connected for movement with said device.

14. An electro-hydraulic actuator assembly comprising:

a hydraulic actuator, an electrically-operated valve adapted for supplying hydraulic fluid to said hydraulic actuator to cause movement of said hydraulic actuator, and an electronic controller adapted for transmitting signals to control the operation of said valve, said electronic controller being programmed for:

providing a first gradually increasing valve position signal from an initial valve position up to a threshold valve position, said threshold valve position being representative of a hydraulic fluid pressure which is sufficient to cause said hydraulic actuator to begin to move, providing a constant valve position signal for a time period which starts when said threshold valve position is reached, and providing a second gradually increasing valve position signal after said time period expires, said second increasing valve position signal being provided from said threshold valve position up to a target valve position.

15. The electro-hydraulic actuator assembly defined in claim 14 wherein said time period of said constant valve position signal is shorter than time periods of said first and second increasing valve position signals.

16. The electro-hydraulic actuator assembly defined in claim 14 wherein said time period of said constant valve position signal is less than one second.

17. The electro-hydraulic actuator assembly defined in claim 14 wherein said first and second increasing valve position signals are linear.

18. The electro-hydraulic actuator assembly defined in claim 14 wherein said first and second increasing valve position signals and said constant valve position signal are adapted to cause said hydraulic actuator to move smoothly.

19. The electro-hydraulic actuator assembly defined in claim 14 wherein said hydraulic actuator comprises a cylinder having a piston disposed therein.

* * * * *